US008740575B2

(12) United States Patent
Bissell et al.

(10) Patent No.: US 8,740,575 B2
(45) Date of Patent: Jun. 3, 2014

(54) LIQUID RING PUMP WITH LINER

(75) Inventors: Douglas Eric Bissell, Monroe, CT (US); Athanasios Diakomis, Seymour, CT (US); Louis J. Lengyel, Trumbull, CT (US)

(73) Assignee: Gardner Denver Nash, LLC, Trumbull, CT (US)

(*) Notice: Subject to any disclaimer, the term of this patent is extended or adjusted under 35 U.S.C. 154(b) by 116 days.

(21) Appl. No.: 13/146,372

(22) PCT Filed: Feb. 5, 2009

(86) PCT No.: PCT/US2009/033191
§ 371 (c)(1), (2), (4) Date: Jul. 26, 2011

(87) PCT Pub. No.: WO2010/090639
PCT Pub. Date: Aug. 12, 2010

(65) Prior Publication Data

US 2011/0286840 A1 Nov. 24, 2011

(51) Int. Cl.
*F04C 19/00* (2006.01)
*B23P 15/00* (2006.01)

(52) U.S. Cl.
USPC .......................... 417/68; 415/196; 29/888.024

(58) Field of Classification Search
CPC .......................... F04C 7/00
USPC .............. 415/173.4, 174.4, 196, 206; 417/68; 29/888.024
See application file for complete search history.

(56) References Cited

U.S. PATENT DOCUMENTS

| | | | | | |
|---|---|---|---|---|---|
| 789,664 | A | | 5/1905 | Look | |
| 2,223,670 | A | * | 12/1940 | Adams | 417/68 |
| 2,609,139 | A | | 9/1952 | Kollsman | |
| 2,966,860 | A | | 1/1961 | Maynard | |
| 3,090,319 | A | * | 5/1963 | Stanley | 415/197 |
| 3,551,067 | A | * | 12/1970 | Wissman | 415/134 |
| 5,100,300 | A | | 3/1992 | Haavik | |

(Continued)

FOREIGN PATENT DOCUMENTS

| | | |
|---|---|---|
| GB | 2 045 351 | 10/1980 |
| JP | 49-20803 | 5/1972 |

(Continued)

OTHER PUBLICATIONS

International Preliminary Report on Patentability mailed Feb. 2, 2011 (9 pages).

(Continued)

*Primary Examiner* — Bryan Lettman
(74) *Attorney, Agent, or Firm* — James B. Conte; Husch Blackwell LLP

(57) ABSTRACT

A liquid ring pump is provided that includes an annular housing having an inner surface forming a housing cavity. The annular housing is filled with an operating fluid during operation of the pump. The operating fluid forms an eccentric liquid ring in the annular housing during operation of the pump. A rotor is disposed in the housing cavity and includes a plurality of rotor blades. A shaft extends into the annular housing into the housing cavity. The plurality of rotor blades extend radially outward from the shaft toward the inner surface of the annular housing. A liner formed from a corrosion resistant material is disposed substantially flush with at least a portion of the annular housing inner surface opposite a plurality of rotor blade ends.

13 Claims, 7 Drawing Sheets

(56) References Cited

U.S. PATENT DOCUMENTS

| | | | | |
|---|---|---|---|---|
| 5,197,863 | A | 3/1993 | Dardis et al. | |
| 5,295,794 | A | 3/1994 | Haavik | |
| 5,370,502 | A | 12/1994 | Haavik et al. | |
| 5,395,215 | A | 3/1995 | Dardis et al. | |
| 5,513,954 | A | 5/1996 | Bourgeois | |
| 5,575,629 | A | 11/1996 | Olsen et al. | |
| 5,653,582 | A | 8/1997 | Harvey et al. | |
| 5,685,692 | A | 11/1997 | Grzina | |
| 6,390,768 | B1 | 5/2002 | Muhs et al. | |
| 6,974,305 | B2 | 12/2005 | Garrett | |
| 2003/0059293 | A1 * | 3/2003 | Chancey | 415/56.1 |

FOREIGN PATENT DOCUMENTS

| | | |
|---|---|---|
| JP | 55-151193 | 11/1980 |
| JP | 57-115990 | 1/1981 |
| JP | 02-301692 | 12/1990 |
| JP | 10-77982 | 3/1998 |

OTHER PUBLICATIONS

PCT International Search Report for International Application No. PCT/US2009/033191 mailed Jun. 25, 2009 (2 pages).

PCT Written Opinion of the International Searching Authority mailed Jun. 25, 2009 (6 pages).

English translation of Reasons of Refusal for Japanese companion case 2011-549133 (2 pages).

English Abstract of JP 02-301692 (1 page).

English Abstract of JP 10-77982 (1 page).

Applicant's partial English translation of J 49-20803 (1 page).

Applicant's partial English translation of JP 57-115990 (2 pages).

* cited by examiner

LIQUID RING PUMP WITH LINER

FIELD OF INVENTION

The present invention relates to a liquid ring pump. More particularly, the invention relates to a liner positioned substantially flush with an annular housing of a liquid ring pump.

BACKGROUND

Liquid ring pumps are well known. U.S. Pat. No. 4,850,808, Schultze, discloses such a liquid ring pump. The pump has one or two stages. The pump includes an annular housing; a rotor assembly within the annular housing; a shaft extending into the annular housing on which the rotor assembly is fixedly mounted; and a motor assembly coupled to the shaft. During operation, the annular housing is partially filled with operating liquid so that when the rotor is rotating, the rotor blades engage the operating liquid and cause it to form a liquid ring that diverges and converges in the radial direction relative to the shaft. Where the liquid is diverging from the shaft, the resulting reduced pressure in the spaces between adjacent rotor blades of the rotor assembly (buckets) constitutes a gas intake zone. Where the liquid is converging towards the shaft, the resulting increased pressure in the spaces between adjacent rotor blades (buckets) constitutes a gas compression zone.

U.S. Pat. No. 4,251,190, Brown discloses a water ring rotary air compressor. The compressor includes an annular housing; a rotor assembly disposed within the annular housing; a motively powered shaft extending into the annular housing and fixedly coupled to the rotor assembly. The rotor assembly utilizes a pumping liquid and creates a liquid ring in a manner similar to U.S. Pat. No. 4,850,808.

Through prolonged use of such pumps, the liquid ring may cause corrosion of the surfaces of the annular housing that are in contact with the liquid ring. For example, the annular housing may experience corrosion erosion, cavitation erosion, and/or particle erosion. Over time the corrosion roughens the wetted surfaces of the annular housing thereby increasing a frictional drag of the liquid ring along the surface of the annular housing. The increased drag requires an increase in the amount of power that is necessary for the shaft to properly operate the pump. Accordingly, the efficiency and life-span of the pump is decreased. For example, tests conducted on a 7.5 Hp vacuum pump operating at 1750 rpm show that over 10-15 weeks of operation the annular housing surface roughness increased so much that to maintain the 1750 rpm operating speed, shaft power had to be increased by as much as 6.2%. Some known liquid ring pumps have addressed the issue of corrosion and annular housing surface roughness by forming annular housings from corrosion resistant casting materials, such as cast stainless steel. However, the cost of cast stainless steel is several times the cost of cast iron thereby making this approach uneconomical.

SUMMARY

It is advantageous to reduce corrosion associated with liquid ring pumps. Accordingly, the present invention provides a liner positioned substantially flush with at least a portion of the annular liquid ring pump housing. The liner is formed from one or more pieces of stainless steel, Hastelloy, copper, nickel, and/or any other suitable corrosive resistant material and/or plastic. The multi-piece liner may consist of an annular disk and a formed sheet of thin material such as stainless steel, Hastelloy, copper, nickel, and/or any other suitable corrosive resistant material and/or plastic. The one-piece liner may be formed by one of or a combination of metal spinning, deep drawing, hydro-forming and/or any other suitable method of forming a liner. In one embodiment, the liner (one-piece or multi-piece) is coupled to the annular housing of the pump by any one of, but not limited to, fastening, welding, and adhesion. In another embodiment, the liner is configured to be removably attached to the annular housing of the pump to facilitate pump repair. The liner is coupled so the coupling prevents rotation of the liner relative to the annular housing during operation of the pump.

In an embodiment of the invention, the liner includes an annular sleeve section disposed substantially flush with an annular segment of the annular housing. The liner also includes a closed end extending radially inward from a first end of the annular sleeve. The closed end is disposed substantially flush with a closed end of the annular housing. The liner may also include a flange extending from a second end of the annular sleeve to facilitate coupling and sealing the liner to the annular housing.

Further areas of applicability of the present invention will become apparent from the detailed description provided hereinafter and/or the drawings. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and/or the accompanying drawings, wherein.

DETAILED DESCRIPTION

Figure 1:
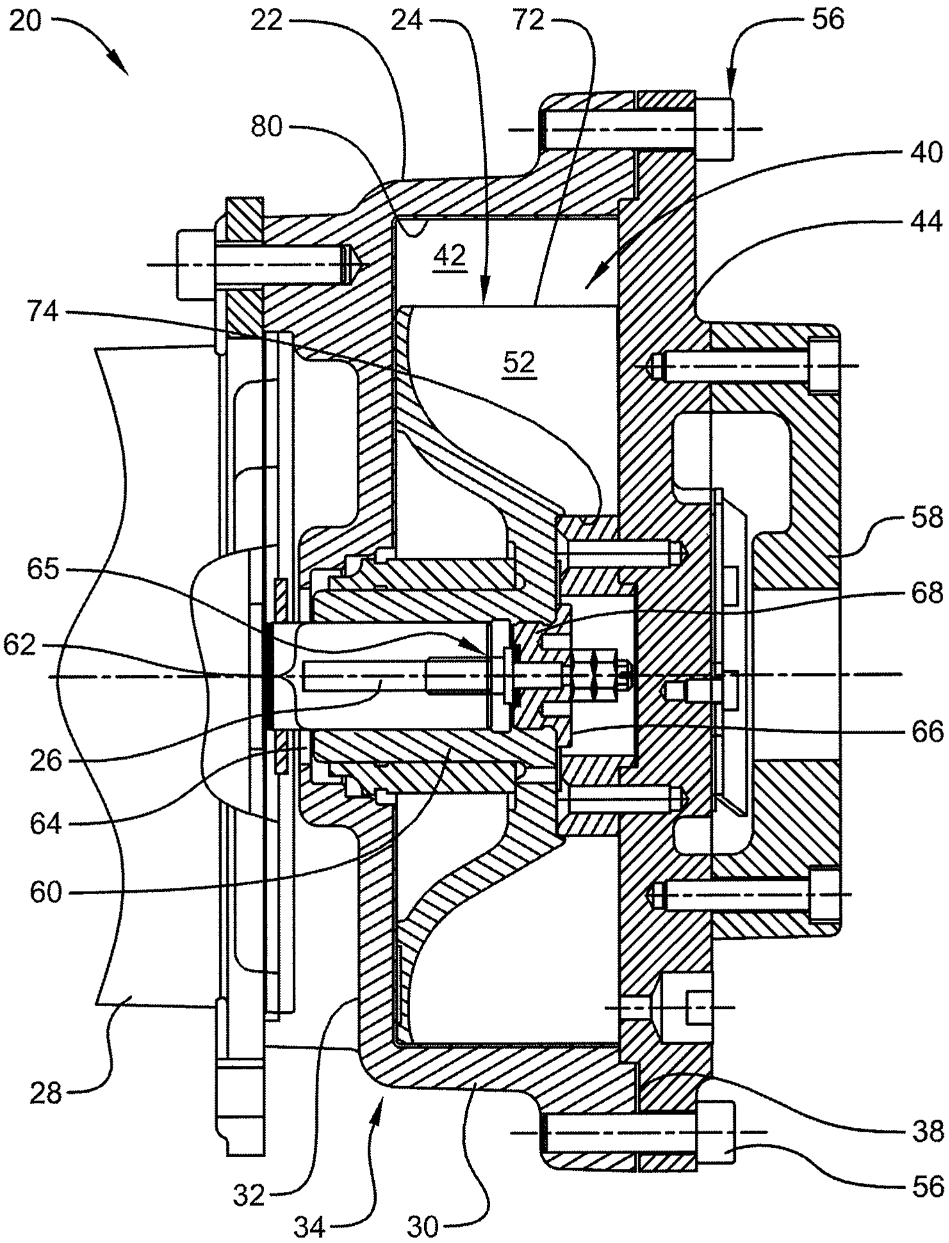
FIG. 1 is an irregular partial sectional view taken parallel to the shaft of a liquid ring pump embodying the invention.
Figure 2:
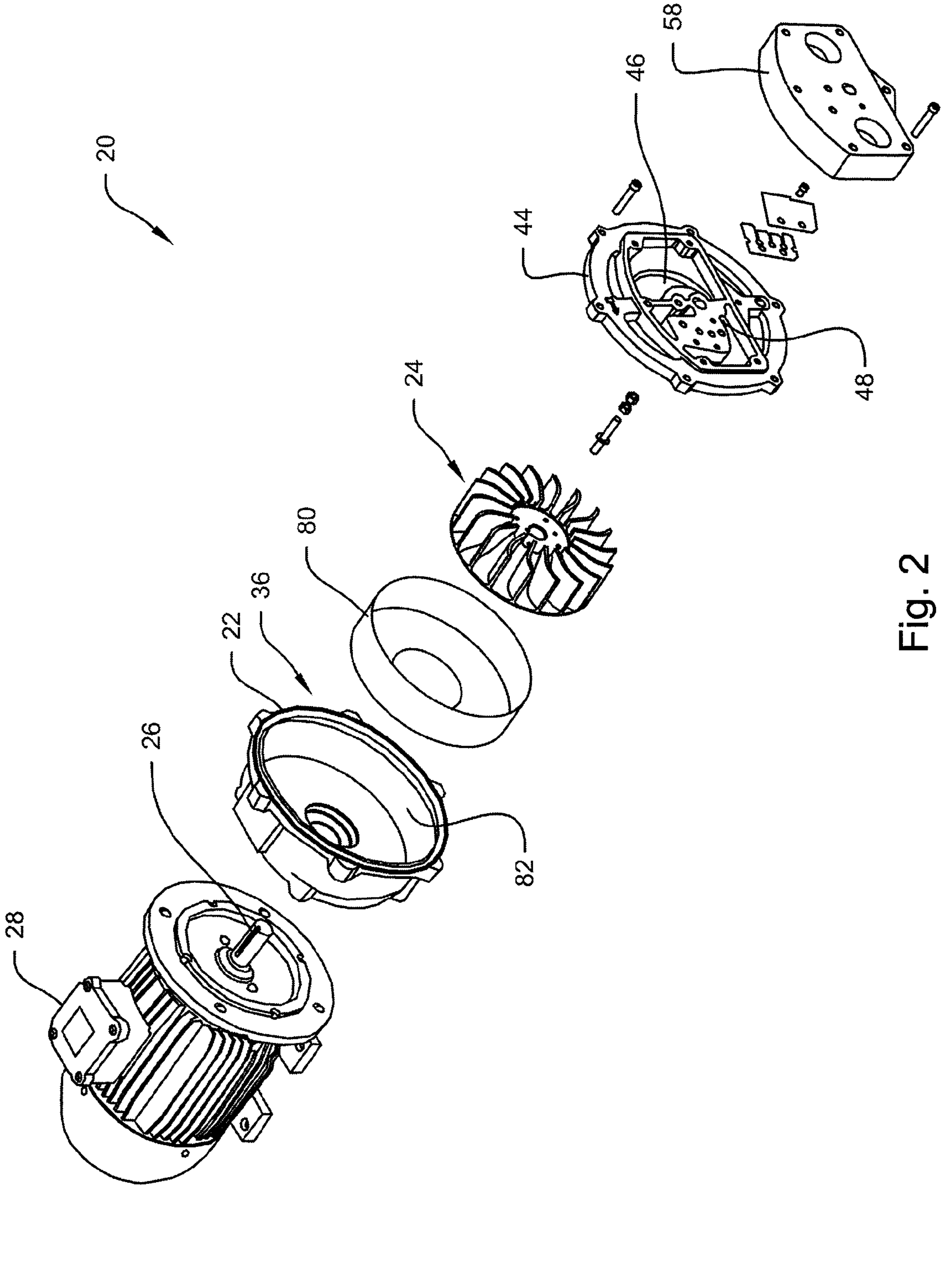
FIG. 2 is an exploded view of the liquid ring pump shown in FIG. 1. The plug shown in FIG. 1 was intentionally omitted.
Figure 3A:
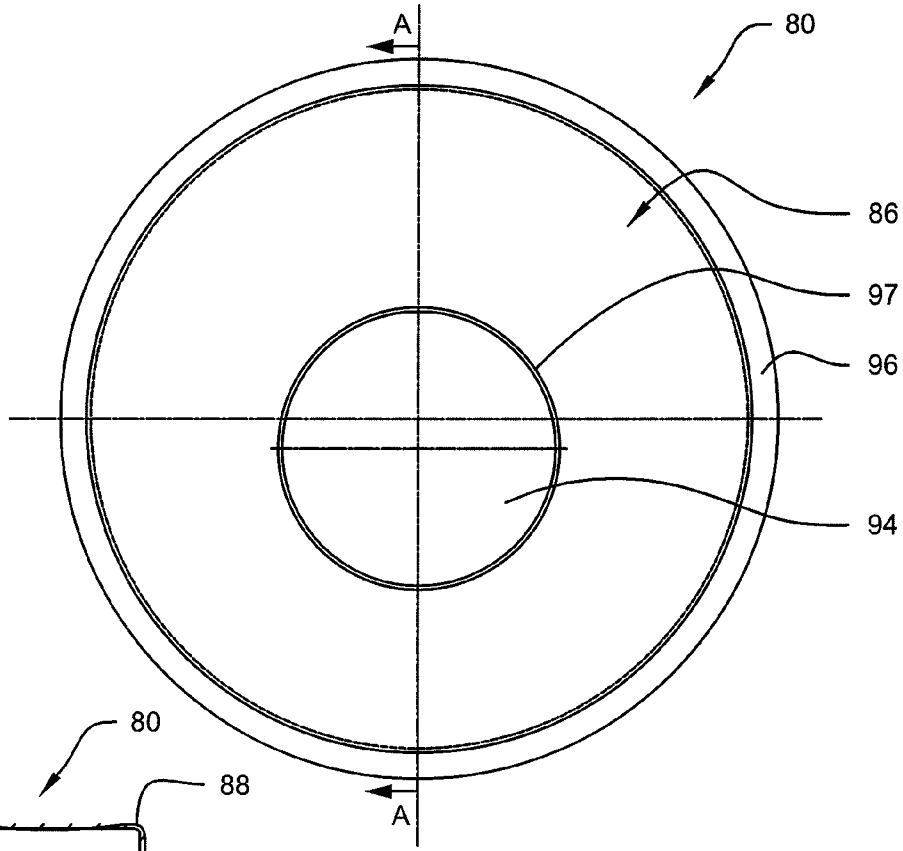
FIG. 3A is a view of a closed end, at a first end of the liner shown in FIG. 1.
Figure 3B:
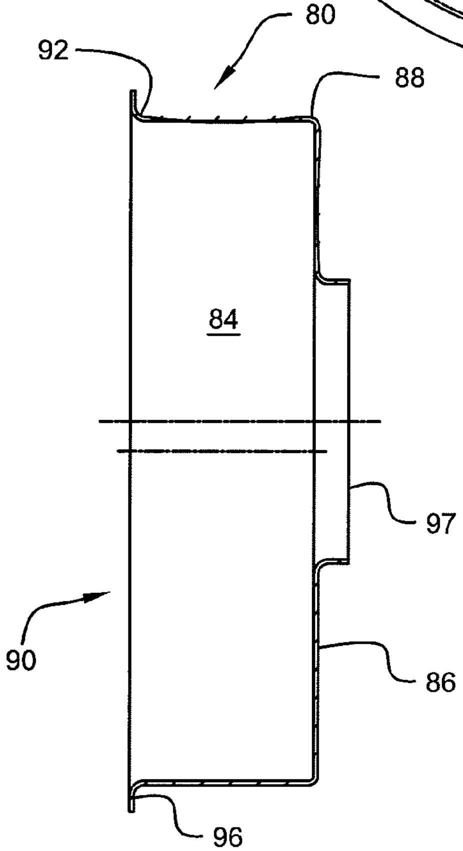
FIG. 3B is a section view of the liner shown in FIG. 1.
Figure 3C:
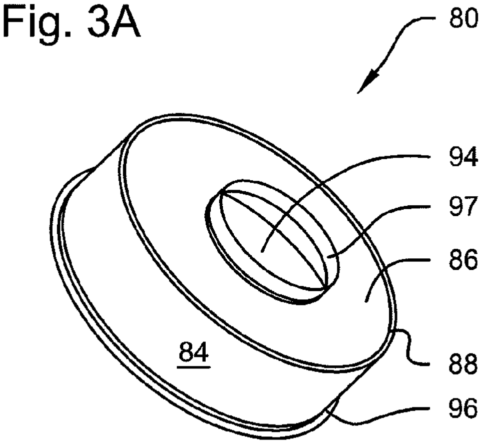
FIG. 3C is a perspective view of a closed end, at a first end of the liner shown in FIG. 1.

The following description of the preferred embodiment(s) is merely exemplary in nature and is in no way intended to limit the invention, its application, or uses.

As can be seen with reference to FIGS. 1-7, a liquid ring pump 20 is provided that includes an annular housing 22, a rotor 24 within the housing 22, and a shaft 26 of a driver or prime mover 28 extending into the annular housing 22. The annular housing 22 includes an annular segment 30 and a closed end 32 that extends radially inward from a first end 34 of the annular segment 30. An open end 36 of the annular housing 22 is formed at a second end 38 of the annular segment 30 opposite the closed end 32. Housing 22 may be formed from cast iron, ductile iron, and/or any other metallic or non-metallic material. In one embodiment, the annular housing 22 can be formed from plastic to prevent corrosion of the annular housing 22. The rotor 24 is fixedly mounted to shaft 26. The annular housing 22 forms a lobe which provides a cavity 40 in which rotor 24 and an operating liquid 42 are disposed.

A port plate 44 covers the open end 36 of housing 22. The port plate 44 has a gas inlet port 46 and a gas discharge port 48 from which gas enters and exits spaces 50 formed by successive or adjacent rotor blades 52, said spaces referred to as buckets. Each bucket 50 is sealed off by the inner surface 54 of operating liquid 42 when the pump 20 is in the running mode. Thus the buckets 50, when the pump 20 is in the running mode, are sealed buckets. Port plate 44 is secured to housing 22 by way of screws 56 or other appropriate means. A connection plate 58 is secured to port plate 44 by way of screws or other appropriate means. The annular housing 22 at closed end 32 is secured to driver 28. In the shown example, driver 28 is an electric motor. Of course, the driver 28 could be something other than an electric motor.

Rotor 24 includes a hub 60 from which rotor blades 52 extend. A cylindrical bore 62 extends into the hub 60. Shaft 26, extending through a bore 64 formed in the closed end 32 of the annular housing 22, extends into cylindrical bore 62. The shaft 26 has a free end 65 oriented towards port plate 44. The free end 65 is adjacent plug 66. Plug 66 has a body 68 that is secured in hub bore 62. The hub 60 is fixedly mounted to shaft 26.

Each rotor blade 52 has a first axially extending end 72, which extends in the axial direction relative to shaft 26. Each rotor blade 52 has a second axially extending free end 74, extending in the axial direction relative to shaft 26. Each second free end 74 is substantially parallel to shaft 26. The second free ends 74 form a cavity 76. Arrow 78 illustrates the direction of rotation of the rotor 24.

Figure 4A:
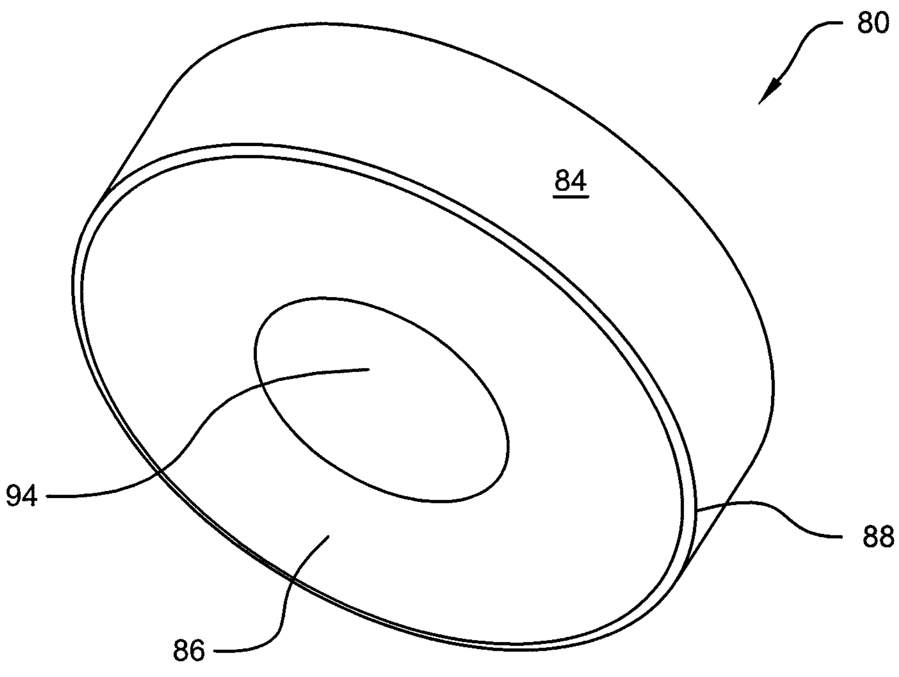
FIG. 4A is a perspective view of a closed end, at a first end of an alternative embodiment of the liner shown in FIG. 1.
Figure 4B:
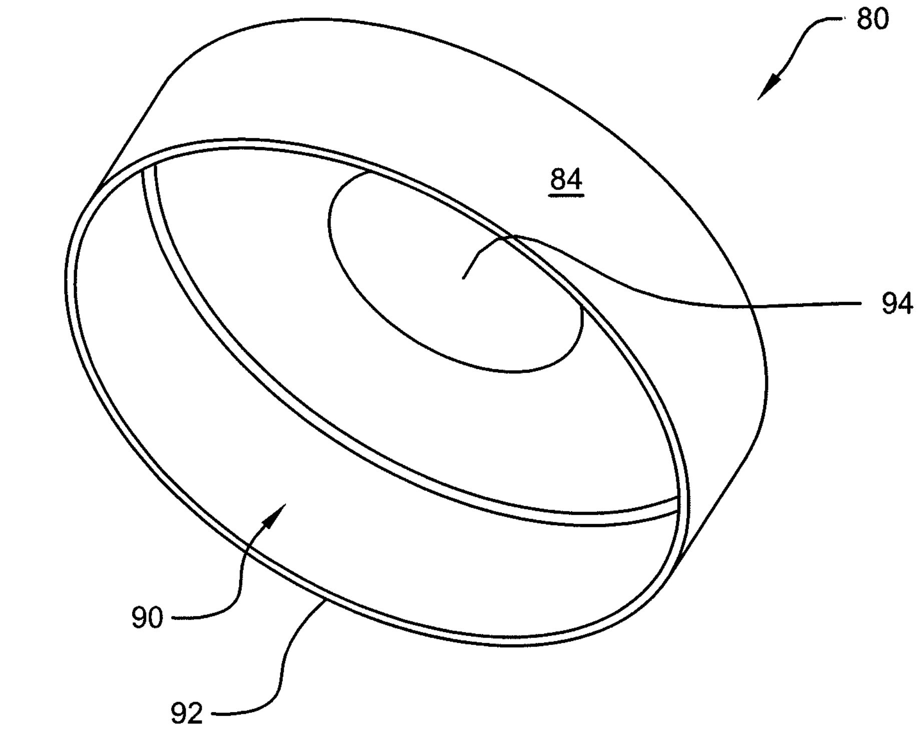
FIG. 4B is a perspective view of an open end, at a second end of an alternative embodiment of the liner shown in FIG. 1.
Figure 5A:
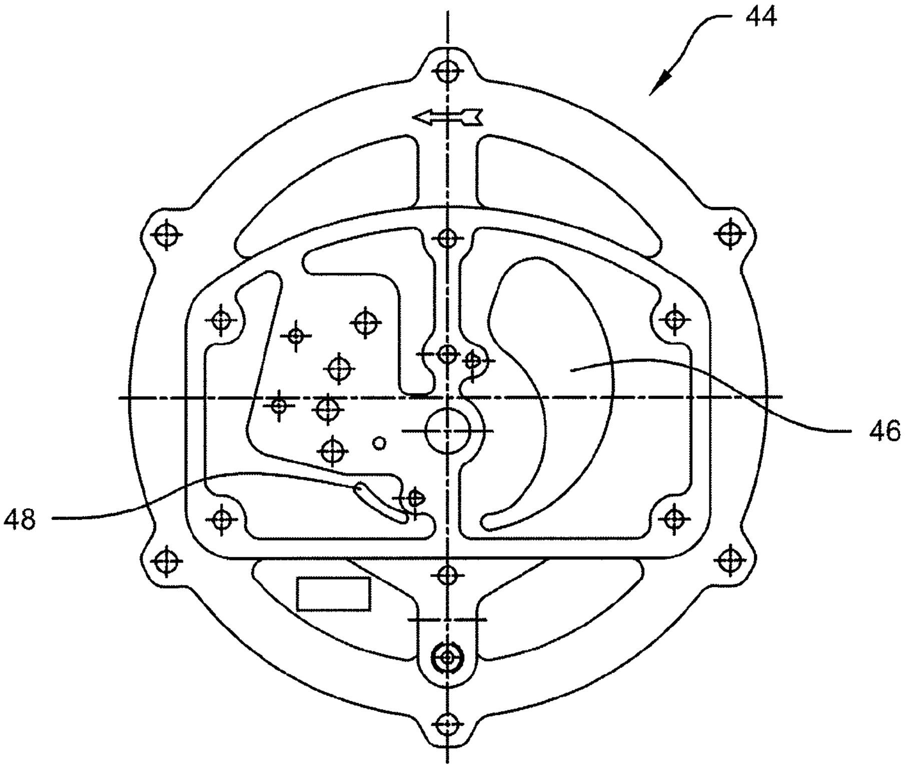
FIG. 5A is a front view of the port plate shown in FIGS. 1 and 2.
Figure 5B:
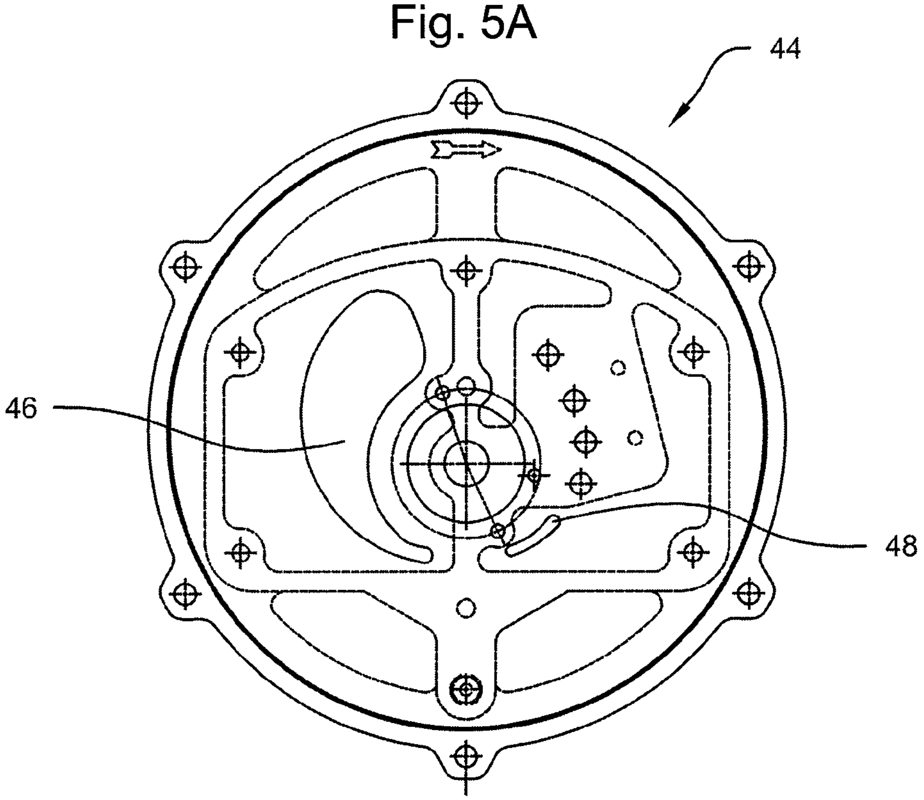
FIG. 5B is a rear view of the port plate shown in FIG. 5A.
Figure 6:
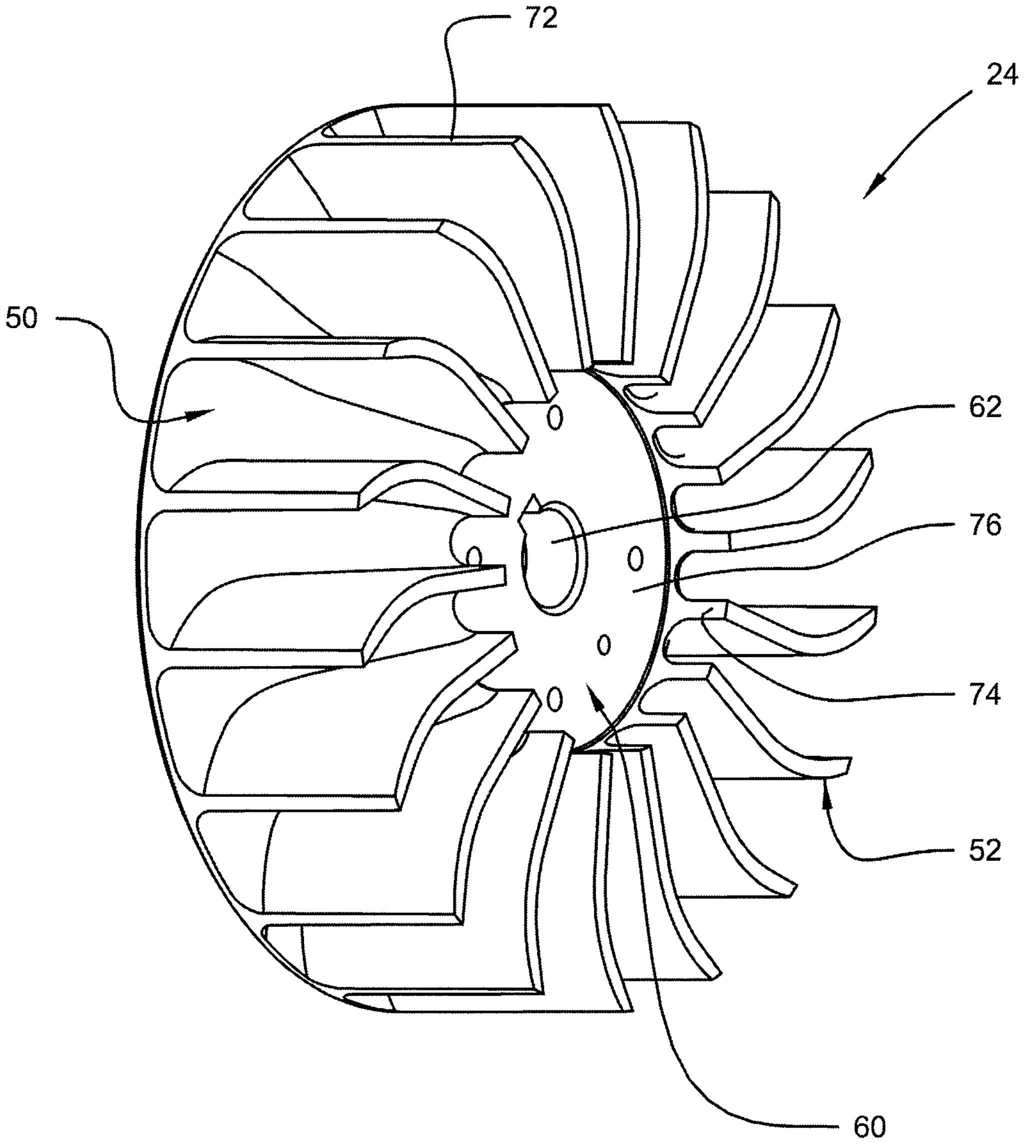
FIG. 6 is a front perspective view of the rotor shown in FIG. 1.
Figure 7:
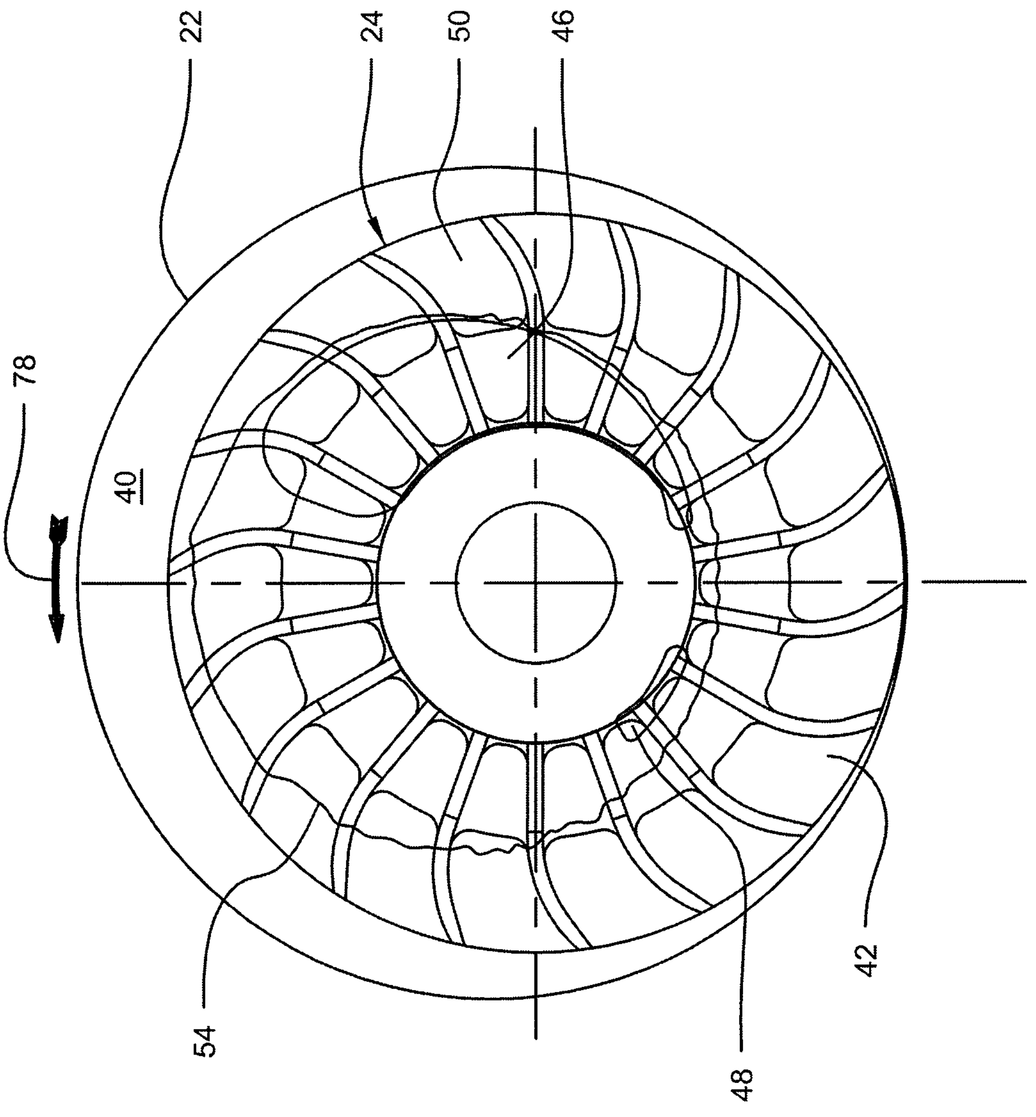
FIG. 7 is a schematic sectional representation taken perpendicular to the shaft of the liquid ring pump to highlight the relative position of the rotor, operating liquid, buckets, inlet port, and discharge port when the pump is in the running mode.

A liner 80 is positioned substantially flush with an inner surface 82 of annular housing 22. The liner facilitates reducing an amount of corrosion of annular housing 22 as a result of contact with operating liquid 42. Liner 80 reduces corrosion by providing a barrier between the operating liquid and annular housing 22 during operation of the liquid pump. As can be seen with reference to FIG. 3A, FIG. 3B, and FIG. 3C, liner 80 includes an annular sleeve section 84 and a closed end 86 that extends radially inward from a first end 88 of the annular sleeve section 84. An open end 90 of the liner 80 is formed at a second end 92 of the annular sleeve section 84 opposite the closed end 86. The annular sleeve section 84 of the liner is positioned substantially flush with the annular segment 30 of annular housing 22, and the closed end 86 of the liner 80 is positioned substantially flush with the closed end 32 of the annular housing 22. The closed end 86 of the liner 80 includes a bore 94 extending therethrough. Bore 94 encompasses bore 64 formed in the closed end 32 of the annular housing 22 so that shaft 26 extends through both bore 94 and bore 64. Liner 80 also includes a flange 96 extending from a second end 92 of the liner annular sleeve section 84. Flange 96 is configured to facilitate coupling the liner 80 to annular housing 22 and to aid in sealing the housing 22 from the operating liquid 42. Specifically, flange 96 overlaps the second end 38 of the housing annular ring 30. The flange 96 is coupled between the housing 22 and the port plate 44. Liner 80 further includes a flange 97 that extends circumferentially around the liner bore 94 to further facilitate coupling and sealing the liner 80 to the annular housing 22. In another embodiment, as shown in FIG. 4A and FIG. 4B, liner 80 may be formed without flanges 96 and 97.

Liner 80 is formed from a corrosion resistant material, for example, stainless steel, Hastelloy, copper, nickel, and/or any other suitable corrosive resistant material. The liner 80 could also be plastic. Generically Hastelloy is a super allow or high performance alloy whose primary ingredient is nickel. Liner 80 may be formed by any number of processes including, but not limited to, metal spinning, deep drawing, hydro-forming, molding and/or any other suitable method of forming a liner. Liner 80 may be made of one or more pieces. If made in one piece, liner 80 is seamless. Further, liner 80 may be coupled to the annular housing 22 using various different methods such as fastening, welding, adhesion, and/or any other suitable known method. In one embodiment, liner 80 is removably coupled to the annular housing 22 to facilitate repairing the pump 20. The liner is coupled to the housing wherein the coupling provides an attachment to the housing which prevents rotation of the liner relative to the housing during operation of the pump.

Although the liner 80 is described and illustrated as covering an entire inner surface of the annular housing 22, it will be appreciated by one of skill in the art that the liner 80 may take on any number of configurations. For example, when liner 80 is in use with smaller pumps, liner 80 may have a cup-like shape configured to fit substantially flush in the cup-like housing of the pump. Moreover, the liner 80 may be formed to cover the entire wetted surface of the annular housing 22 or a portion of the wetted surface that is most susceptible to corrosion. For example, liner 80 may be formed to only cover the radially and axially extending inner surfaces of the annular housing 22 that are traversed by the liquid ring of operating liquid 42 formed during operation of pump 20.

During operation, the annular housing 22 is partially filled with operating liquid 42 so that when the rotor 24 is rotating, the rotor blades 52 engage the operating liquid 42 and cause it to form a liquid ring that diverges and converges in the radial direction relative to the shaft 26. The liner 80 creates a non-corrosive barrier between the operating liquid 42 and the annular housing 22, thereby protecting the annular housing 22 from corrosion. Accordingly, an amount of corrosion erosion, cavitation erosion, and/or particle erosion in pump 20 is reduced. The reduction allows the liquid ring to rotate in the annular housing 22 with less fluid drag and fewer turbulence losses. By reducing the turbulence losses and fluid drag of the liquid ring, the pump requires less power to rotate shaft 26 at a given speed. Hence, liner 80 provides a cost-effective means to maintain the efficiency and life-span of the pump 20 by reducing the amount of corrosion that results from contact between the operating liquid 42 and the annular housing 22.

This is a method of manufacturing a corrosive-resistant liquid ring pump 20. The method includes providing an annular housing 22 having an inner surface 82 that forms a housing cavity. A rotor 24 having a plurality of rotor blades 52 is positioned in the housing cavity and a shaft 26 is extended into the annular housing 22 into the housing cavity so that the plurality of rotor blades 52 extend radially outward from the shaft 26 toward the annular housing 22. A liner 80 formed from corrosion resistant material is positioned substantially flush with at least a portion of the housing inner surface 82. The liner 80 is formed from a material such as, but not limited to, stainless steel, Hastelloy, copper, or nickel using one of metal spinning, deep drawing, hydro-forming, and/or any other suitable method for forming a liner. The liner 80 consists of one or more components which together form an annular sleeve section 84 and a closed end 86 extending radially inward from a first end of the annular sleeve section 84. The annular sleeve section 84 of the liner 80 is positioned substantially flush with an annular segment 30 of the annular housing 22, and the closed end 86 of the liner 80 is positioned substantially flush with a closed end 32 of the annular housing 22. In an alternative embodiment, the liner 80 is positioned only along the axially extending surface of the annular housing inner surface 82.

Though the invention has been described by reference to an example of a single stage liquid ring pump, the invention is equally applicable to two stage liquid ring pumps or pumps having two or more single staged sections. The above is only an example of an embodiment of the invention. There are other examples which would include different embodiments of the invention. Many modifications and variations in the present invention are possible in light of the above teachings. It is to be understood that within the scope of the appended claims, the invention may be practiced otherwise then as specifically described herein. The recitations in the claims are to be read inclusively.

What is claimed:

1. A liquid ring pump comprising:

an annular housing forming a housing cavity, said housing cavity configured to be filled with an operating liquid during operation of said pump, said operating liquid adapted to form a liquid ring in said annular housing during operation of said pump, said annular housing comprises an annular segment and a closed end extending radially inward from a first end of said annular segment, said annular housing has an open end formed at a second end of said annular segment, said open end is opposite said closed end;

a port plate covers said open end of said annular housing, said port plate has an inlet port and an outlet port;

a rotor disposed in said housing cavity, said rotor comprising a plurality of rotor blades; each rotor blade having a free end extending in the axial direction relative to a shaft;

said shaft extending into said annular housing into said housing cavity through a bore in said closed end of said annular housing, said plurality of rotor blades extending radially outward from said shaft toward said annular housing; and an annular liner formed from a corrosion resistant material is disposed substantially flush with at least a portion of an inner surface of said annular housing, said annular liner comprises an annular sleeve section and a closed end extending radially inward from a first end of said annular sleeve, and said closed end of said annular liner disposed substantially flush with said closed end of said annular housing, said annular sleeve of said liner disposed substantially flush with said annular segment of said annular housing, said closed end of said annular liner has a bore, said shaft extending through said annular housing bore and said bore in said closed end of said annular liner;

a first flange extends from a second end of said annular sleeve, said second end of said annular sleeve is at an open end of said liner, said first flange overlaps the second end of said annular segment of said housing, the first flange is coupled between the annular housing and the port plate, wherein the first flange is configured to facilitate coupling of the liner to the housing and to aid in sealing the housing from the operating liquid, said open end of said housing and said port plate are oppositely facing and exert opposing forces on said overlapping portion of said first flange;

a second flange forming a part of said liner and extending around said liner bore, said second flange extending into said housing bore; and wherein said annular liner is fixedly coupled to said annular housing of said liquid ring pump, said coupling preventing rotation of said liner relative to said annular housing during operation of said pump.

2. A liquid ring pump in accordance with claim 1, wherein said liner is attached to said annular housing by at least one of fastening, welding, and adhesion.

3. A liquid ring pump in accordance with claim 1 , wherein said liner is removable from said annular housing to facilitate repairing said pump.

4. A liquid ring pump in accordance with claim 1, wherein said liner is disposed along an axially extending surface of the inner surface of said annular housing.

5. A liquid ring pump in accordance with claim 1, wherein said liner is formed from one of a group consisting of stainless steel, copper, nickel, and plastic.

6. A liquid ring pump in accordance with claim 1, wherein said annular housing is formed from plastic.

7. A liner for a liquid ring pump, the liquid ring pump including an annular housing having an annular segment and a closed end extending radially inward from a first end of the annular segment, said closed end has a bore there through, said annular housing has an open end formed at a second end of said annular segment, said open end is opposite said closed end, a port plate covers said open end of said annular housing, said port plate has an inlet port and an outlet port, said liner comprising:

a liner annular sleeve disposed substantially flush with the annular segment of the annular housing;

a closed end extending radially inward from a first end of said liner annular sleeve, said closed end disposed substantially flush with the closed end of the annular housing, said closed end has a bore there through;

an open end at a second end of said annular sleeve;

a first flange extending from said second end of said annular sleeve, said flange overlaps the second end of said annular segment of said housing, the first flange is coupled between the annular housing and the port plate, wherein the first flange is configured to facilitate coupling of the liner to the housing and to aid in sealing the housing from the operating liquid, said open end of said housing and said port plate are oppositely facing and exert opposing forces on said overlapping portion of said first flange;

a second flange forming part of said annular liner, said second flange extending around said bore in said closed end of said annular liner, said flange extending into said bore of said closed end of said annular housing;

a fixed coupling between said liner and said annular housing; and said liner formed from a corrosion resistant material.

8. A liner in accordance with claim 7, wherein said liner is coupled to the annular housing of the pump by at least one of fastening, welding, and adhesion.

9. A liner in accordance with claim 7, wherein said liner is formed from one of a group consisting of stainless steel, copper, nickel, and plastic.

10. A liner in accordance with claim 9, wherein said liner is formed by at least one of metal spinning, deep drawing, and hydro-forming.

11. A liner in accordance with claim 7, wherein said liner is configured to be removably coupled to the annular housing of the pump to facilitate pump repair.

12. A method of manufacturing a corrosive-resistant liquid ring pump, said method comprising:

providing an annular housing having an inner surface that forms a housing cavity, said annular housing comprises an annular segment and a closed end extending radially inward from a first end of said annular segment, said annular housing has an open end formed at a second end of said annular segment, said open end is opposite said closed end;

positioning a closed end of an annular liner substantially flush with said closed end of said annular housing;

positioning an annular sleeve of said annular liner substantially flush with said annular segment of said annular housing;

overlapping a first flange extending from a second end of said annular sleeve with the second end of said annular segment of said housing;

inserting a second flange, which forms a part of said annular liner and which extends around a bore in said closed end of said annular liner, into a bore which extends through said closed end of said annular housing;

extending a shaft through said bore in said closed end of said annular housing and said bore in said closed end of said annular liner;

extending a plurality of rotor blades radially outward from the shaft toward the annular housing;

coupling the first flange between the annular housing and a port plate, said port plate having an inlet port and a discharge port, wherein the first flange is configured to facilitate coupling of the liner to the housing and to aid in sealing the housing from the operating liquid, said open end of said housing and said port plate are oppositely facing and exert opposing forces on said overlapping portion of said first flange;

closing said open end of said annular housing with said port plate.

13. A method in accordance with claim 12 further comprising positioning the liner along a radially and axially extending inner surfaces of the annular housing that are traversed by a liquid ring of operating liquid formed during operation of the pump.

* * * * *